United States Patent
Amit et al.

(10) Patent No.: US 8,370,945 B2
(45) Date of Patent: Feb. 5, 2013

(54) IDENTIFYING SECURITY BREACHES CAUSED BY WEB-ENABLED SOFTWARE APPLICATIONS

(75) Inventors: Yair Amit, Tel-Aviv (IL); Roee Hay, Haifa (IL); Adi Sharabani, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 12/469,404

(22) Filed: May 20, 2009

(65) Prior Publication Data

US 2010/0299754 A1     Nov. 25, 2010

(51) Int. Cl.
*G06F 21/00* (2006.01)
(52) U.S. Cl. .......................................... 726/25; 713/152
(58) Field of Classification Search ...................... 726/25
See application file for complete search history.

(56) References Cited

U.S. PATENT DOCUMENTS

| | | | |
|---|---|---|---|
| 5,974,549 A * | 10/1999 | Golan | 726/23 |
| 6,272,641 B1 * | 8/2001 | Ji | 726/24 |
| 7,343,626 B1 * | 3/2008 | Gallagher | 726/25 |
| 7,962,961 B1 * | 6/2011 | Griffin et al. | 726/25 |
| 2005/0060579 A1 * | 3/2005 | Dickelman et al. | 713/201 |
| 2006/0195588 A1 * | 8/2006 | Pennington et al. | 709/227 |
| 2006/0259764 A1 * | 11/2006 | Asal et al. | 713/166 |
| 2007/0101433 A1 * | 5/2007 | Louch et al. | 726/25 |
| 2008/0049027 A1 * | 2/2008 | Hauke | 345/502 |

FOREIGN PATENT DOCUMENTS

EP     1420562 A3     5/2004

OTHER PUBLICATIONS

Balzarotti et al., "Saner: Composing Static and Dynamic Analysis to Validate Sanitization in Web Applications", 2008, IEEE, pp. 387-401.*
"Skype Cross-Zone Scripting Vulnerabiliity," Thursday, Jan. 17, 2008, Aviv Raff On.NET—Skype cross-zone scripting vulnerability, http://aviv.raffon.net/2008/01/17/SkypeCrosszoneScriptingVulnerability.aspx; pp. 1-3.
"Downloader.Ject," Downloader.Ject—Symantec Corp. http://www.symantec.com/security_response/print_writeup.jsp?docid=2004-061610-4049; pp. 1-2.

* cited by examiner

*Primary Examiner* — Matthew Smithers
(74) *Attorney, Agent, or Firm* — Elissa Y. Wang; Edell, Shapiro & Finnan, LLC

(57) ABSTRACT

Identifying a security breach caused when a computer-based software application uses a computer-based web browser application, including identifying at least one function within a computer-based software application that causes a computer-based web browser application to access data from a source that is external to the software application, at least partially replacing the data with malicious content that is configured to cause a predefined action to occur when the malicious content is accessed by the web browser application, where the predefined action is associated with a known security breach when the predefined action occurs subsequent to the malicious content being accessed by the web browser application, causing the software application to perform the function, and determining whether the predefined action is performed.

18 Claims, 6 Drawing Sheets

IDENTIFYING SECURITY BREACHES CAUSED BY WEB-ENABLED SOFTWARE APPLICATIONS

FIELD OF THE INVENTION

The present invention relates to testing computer-based application software in general, and more particularly to testing web-enabled computer-based application software.

BACKGROUND OF THE INVENTION

It is increasingly common for computer-based software applications to provide web page browsing capabilities within their user-interfaces, typically using embedded web browser software. However, whereas stand-alone web browser applications typically employ numerous security features to shield the user from malicious attacks, other types of software applications that provide web page browsing capabilities, such as media players, typically do not.

In one well-known type of malicious attack that is often referred to as a cross-application scripting attack, data obtained from an untrusted source is sent unfiltered from a trusted application to a web browser. In this type of attack an attacker can, for example, insert malicious content, such as in the form of a JavaScript™ script, into a document, such as one containing Hypertext Markup Language (HTML) source code. If an application accesses the document and does not remove or otherwise quarantine the malicious content before providing it to its browser, the script might be executed by the browser, potentially exposing the host computer to known security breaches, such as where the script is granted access to local resources, cookies and data that stand-alone web browser applications do not provide.

SUMMARY OF THE INVENTION

The present invention in embodiments thereof discloses novel systems and methods for identifying security breaches caused when a computer-based software application uses a computer-based web browser application.

In one aspect of the invention a method is provided for identifying a security breach caused when a computer-based software application uses a computer-based web browser application, the method including identifying at least one function within a computer-based software application that causes a computer-based web browser application to access data from a source that is external to the software application, at least partially replacing the data with malicious content that is configured to cause a predefined action to occur when the malicious content is accessed by the web browser application, where the predefined action is associated with a known security breach when the predefined action occurs subsequent to the malicious content being accessed by the web browser application, causing the software application to perform the function, and determining whether the predefined action is performed, where any of the steps are implemented in either of computer hardware and computer software and embodied in a computer-readable medium.

In another aspect of the invention the method further includes monitoring the execution of the computer-based software application to identify the function.

In another aspect of the invention the steps are performed if the web browser application is embedded within the software application.

In another aspect of the invention the at least partially replacing step includes at least partially replacing the data at the source.

In another aspect of the invention the method further includes providing a notification regarding the security breach.

In another aspect of the invention the method further includes providing any of the applications with a wrapper configured to detect the presence of the malicious content in the data.

In another aspect of the invention the method further includes inspecting and enumerating through GUI objects of the software application, determining whether the software application utilizes the web browser application as an embedded browser object, and querying the embedded browser object to determine the existence of the malicious content that is accessed by the embedded browser object.

In another aspect of the invention the at least partially replacing step includes at least partially replacing the data such that the malicious content includes at least one instruction for interacting with an external resource, and where the method further includes detecting the interaction with the external resource.

In another aspect of the invention a system is provided for identifying a security breach caused when a computer-based software application uses a computer-based web browser application, the system including an application analyzer configured to identify at least one function within a computer-based software application that causes a computer-based web browser application to access data from a source that is external to the software application, a data manipulator configured to at least partially replace the data with malicious content that is configured to cause a predefined action to occur when the malicious content is accessed by the web browser application, where the predefined action is associated with a known security breach when the predefined action occurs subsequent to the malicious content being accessed by the web browser application, a security breach provoker configured to cause the software application to perform the function, and a security breach detector configured to determine whether the predefined action is performed, where any of the application analyzer, data manipulator, security breach provoker, and security breach detector are implemented in either of computer hardware and computer software and embodied in a computer-readable medium.

In another aspect of the invention the software application is configured such that its main purpose does not require it to include functions that are uniquely associated with web browsers, and such that it has the ability to cause the web browser application to perform any functions that are uniquely associated with web browsers.

In another aspect of the invention the web browser application is either of a stand-alone browser application external to the software application and an embedded browser with respect to the software application.

In another aspect of the invention the security breach provoker is configured to simulate network connections to intercept attempts by the web browser application to access the data and ensure that the web browser application accesses the data.

In another aspect of the invention the security breach detector is configured to provide a notification regarding the security breach.

In another aspect of the invention the malicious content is configured to create a window containing a predefined string, and where the security breach detector is configured to detect the creation of the window and determine whether the window contains the predefined string.

In another aspect of the invention the system further includes a wrapper cooperative with either of the software application and the web browser application, where the wrapper is configured to detect the presence of the malicious content in the data.

In another aspect of the invention the system, further includes a GUI inspector configured to inspect and enumerate through GUI objects of the software application, determine whether the software application utilizes the web browser application as an embedded browser object, and query the embedded browser object to determine the existence of the malicious content that is accessed by the embedded browser object.

In another aspect of the invention the malicious content includes at least one instruction for interacting with an external resource, and further includes an external security breach detector configured to detect the interaction with the external resource.

In another aspect of the invention a computer program product is provided for identifying a security breach caused when a computer-based software application uses a computer-based web browser application, the computer program product including a computer readable medium, and computer program instructions operative to identify at least one function within a computer-based software application that causes a computer-based web browser application to access data from a source that is external to the software application, at least partially replace the data with malicious content that is configured to cause a predefined action to occur when the malicious content is accessed by the web browser application, where the predefined action is associated with a known security breach when the predefined action occurs subsequent to the malicious content being accessed by the web browser application, cause the software application to perform the function, and determine whether the predefined action is performed, where the program instructions are stored on the computer readable medium.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Figure 1:
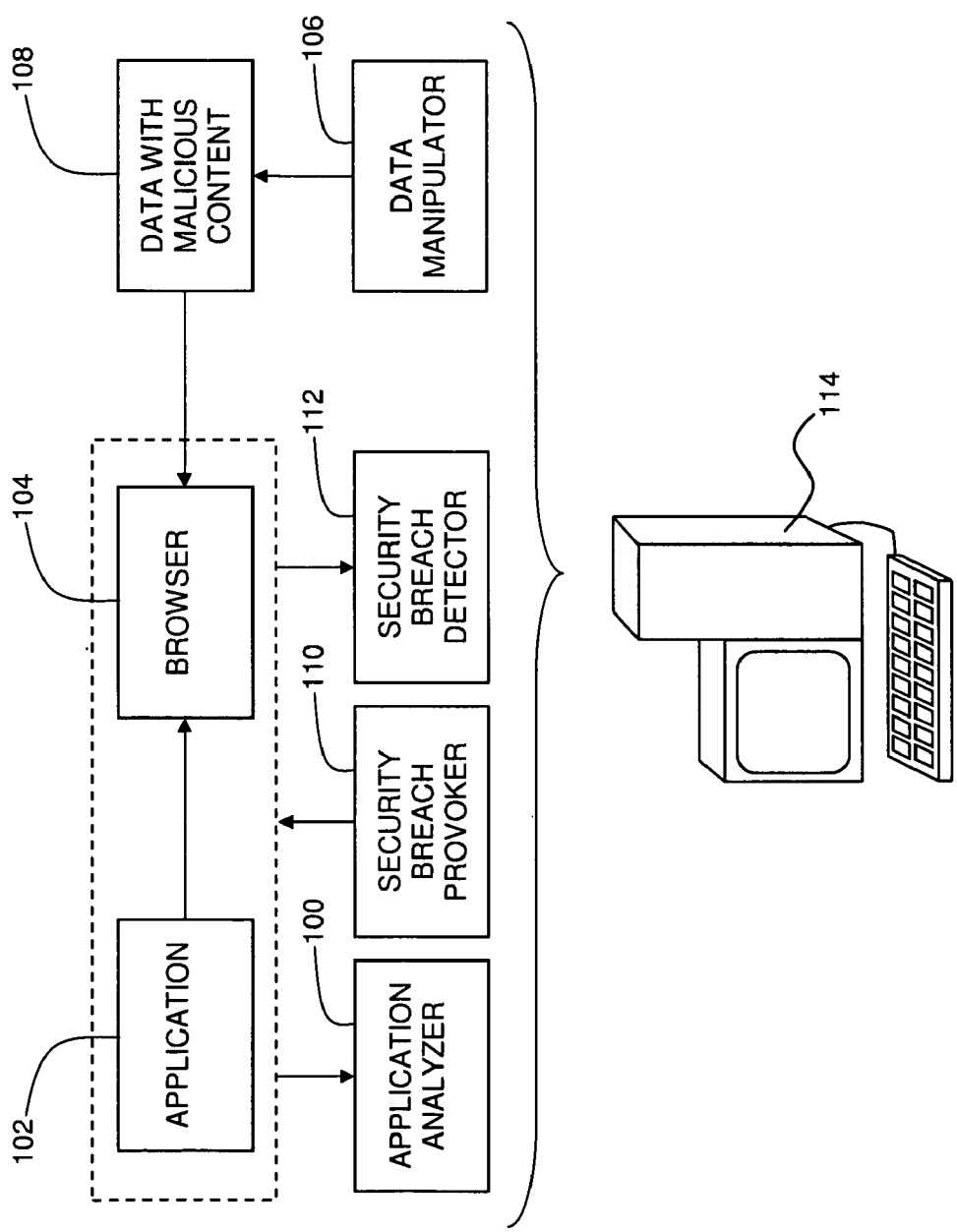
FIG. 1 is a simplified conceptual illustration of a system for identifying security breaches caused when a computer-based software application uses a computer-based web browser application, constructed and operative in accordance with an embodiment of the present invention.

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the an, the present invention may be embodied as a system, method or computer program product. Accordingly, the present invention may take the form of an entirely hardware embodiment, an entirely software embodiment (including firmware, resident, software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as pail of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java. Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1, which is a simplified illustration of a system for identifying security breaches caused when a computer-based software application uses a computer-based web browser application, constructed and operative in accordance with an embodiment of the present invention. In the system of FIG. 1, an application analyzer 100 analyzes a computer-based software application 102 to identify, using conventional techniques, one or more functions within application 102 that causes a computer-based web browser application 104 to access data from a source that is external to application 102. Application 102 is preferably any computer-based software application whose main purpose does not require it to include functions that are uniquely associated with web browsers, but which has the ability to cause browser 104 to perform such functions. For its part, browser 104 may be a stand-alone browser application external to application 102 or may be an embedded browser with respect to application 102. For example, application 102 may be a media player, such as Winamp™, commercially available from http://www.winamp.com, having an embedded web browser. In this example, analyzer 100 monitors the execution of media player to determine when the media player calls its embedded web browser, such as to build up an HTML-based user interlace using a song's metadata.

Once analyzer 100 determines which functions within application 102 cause browser 104 to access data, as well as which data are accessed, the accessed data, or a facsimile thereof, is manipulated, such as by a data manipulator 106, such that the data are partly or wholly replaced with malicious content. The malicious content may be any data and/or instruction code that are configured to cause a predefined action to occur when the data with malicious content 108 is accessed by browser 104, where the predefined action is a known security breach when performed by browser 104, or otherwise provides a known indicator that a security breach is possible. In the example above, the malicious content may, for example, be a JavaScript™ script that reads a file located on the computer that is executing application 102 and sends it to another computer, such as the attacker's;
triggers an indicator such as an "alert" popup window; and/or
executes commands or programs on the computer that is executing application 102, such as to gain full-system control.

Manipulator 106 may also manipulate elements of the accessed data or facsimile such as the data file name and properties such as the data author and description in ways that are designed to elicit such security breaches, and may inject the malicious content into the main data area and/or into metadata where present.

Using conventional techniques, a security breach provoker 110 causes application 102 to perform any of the functions identified by analyzer 100 that causes browser 104 to access data 108. Provoker 110 may simulate network connections as needed to intercept attempts by browser 104 to access data and ensure that browser 104 accesses data 108. A security breach detector 112 then determines whether the predefined action occurs when the data with malicious content 108 is accessed, thus indicating a security breach. If detector 112 detects that the predefined action has occurred, detector 112 may provide a notification using any known technique regarding the security breach, such as may, for example, indicate to a developer of application 102 and/or browser 104 that application 102 and/or browser 104 should be modified to prevent the security breach from occurring in the future.

In one embodiment the malicious content may be configured to create a window containing a predefined string. Security breach detector 112 preferably sets an event hook, such as by employing the Microsoft™ Windows™ event hooking mechanism (i.e., SetWindowsHookEx), in order to detect window creation events. When window is created, the event is detected by security breach detector 112, and if the window contains the predefined string, it means that the malicious content has been executed, whereupon detector 112 may provide a notification using any known technique regarding the security breach. Setting hooks of this kind may be done globally, so if the malicious content is propagated into other application components, such as processes and threads, and is executed, this will be detected as well by security breach detector 112.

In one embodiment of the present invention any of the elements shown in FIG. 1 are implemented as a computer program product embodied in a computer-readable medium, such as in the form of computer program instructions stored on magnetic or optical storage media or embedded within computer hardware, and are executed by or otherwise accessible 10 a computer 114.

Figure 2:
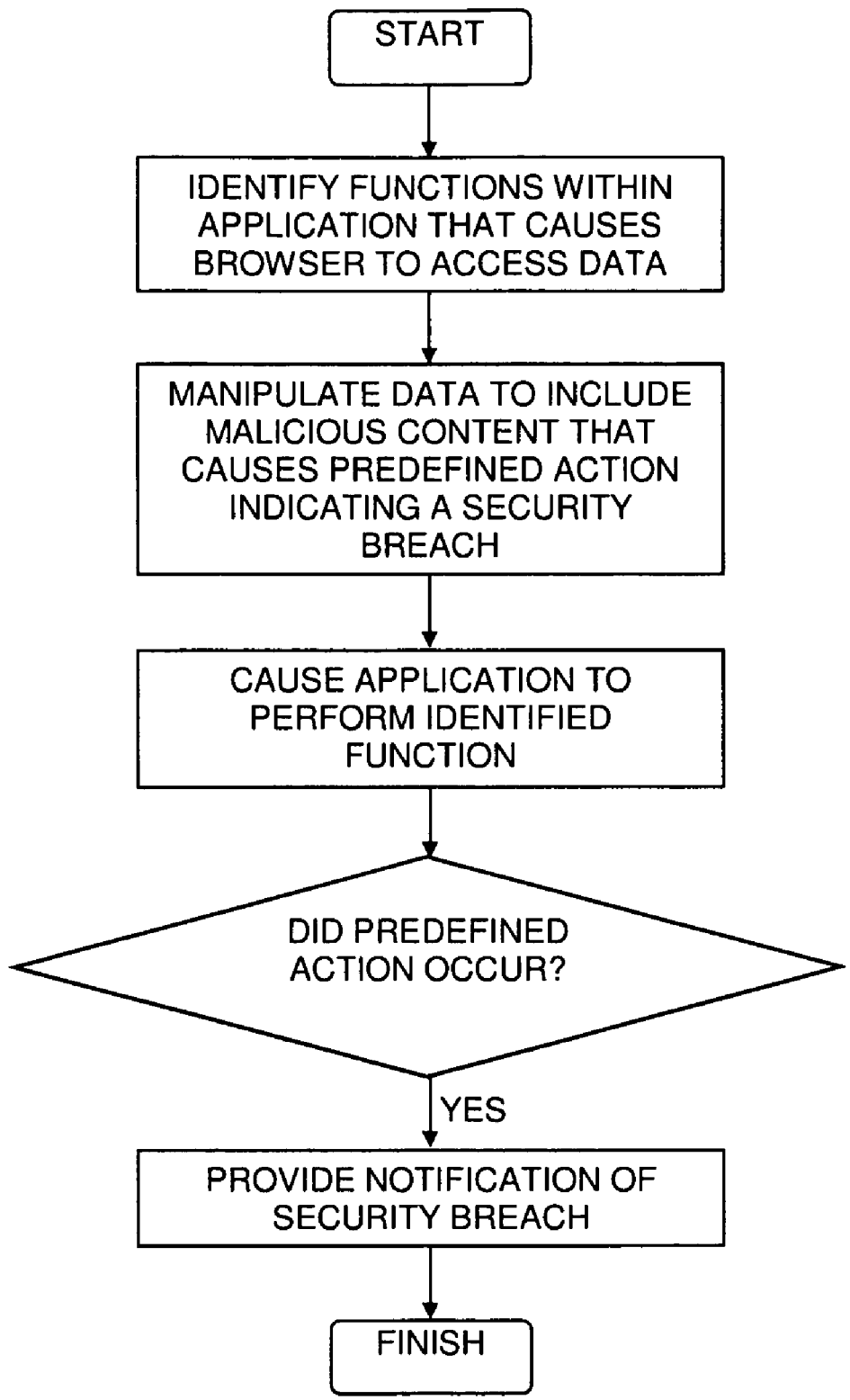
FIG. 2 is a simplified flowchart illustration of an exemplary method of operation of the system of FIG. 1, operative in accordance with an embodiment of the present invention.

Reference is now made to FIG. 2, which is a simplified flowchart illustration of an exemplary method of operation of the system of FIG. 1, operative in accordance with an embodiment of the present invention. In the method of FIG. 2, one or more functions are identified within a computer-based software application that causes a computer-based web browser application to access data from a source that is external to the first application. The accessed data, or a facsimile thereof, are then manipulated such that the data are partly or wholly replaced with malicious content, being any data and/or instruction code that are configured to cause a predefined action to occur when the data with malicious content is accessed by a browser, and where the predefined action, is a known security breach when performed by a browser. The application is then caused to perform any of the functions that have been identified to cause the browser to access the modified data. If the predefined action occurs when the data with malicious content is accessed by the browser, a notification may be provided regarding the security breach.

Figure 3:
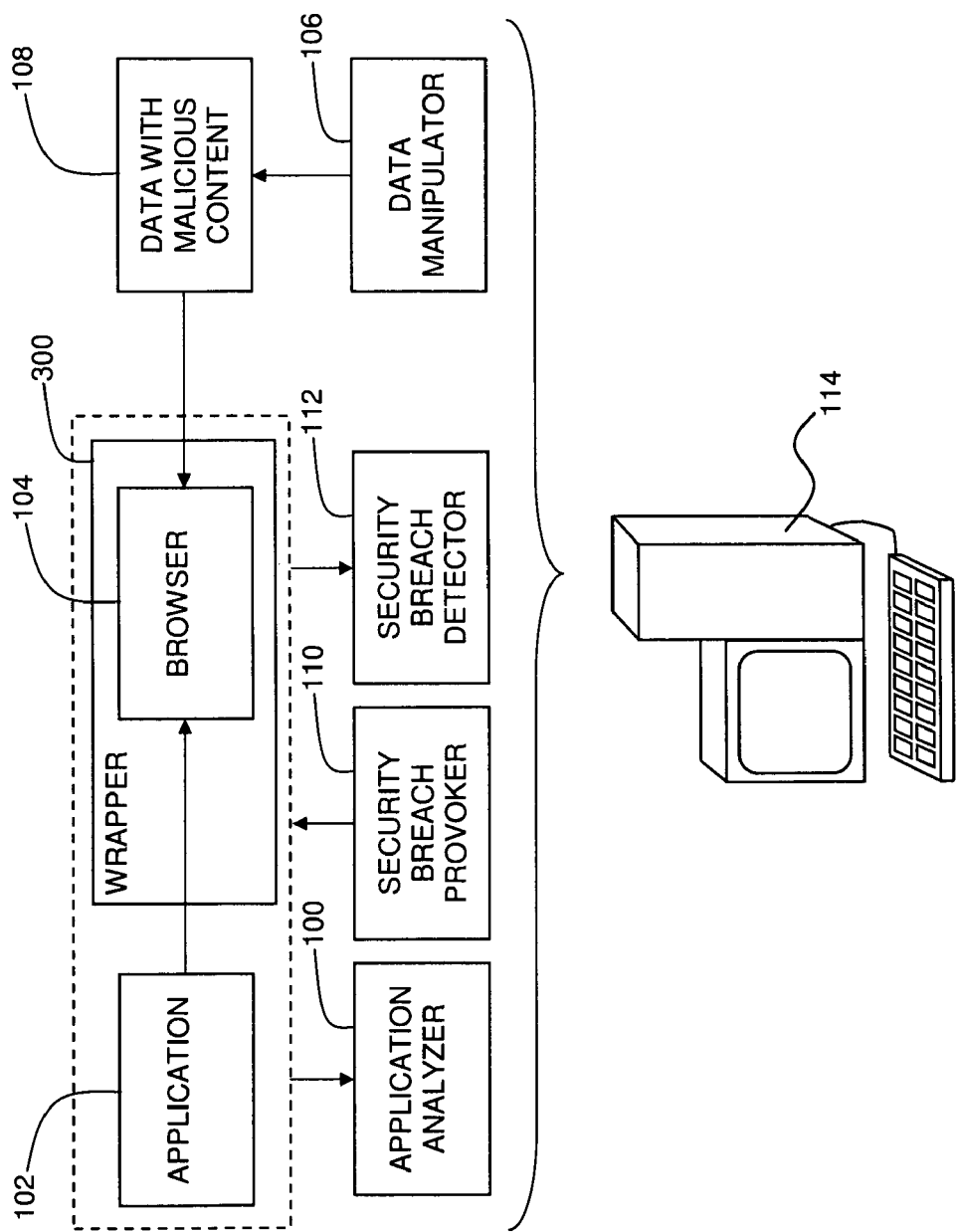
FIG. 3, FIG. 4 and FIG. 5 are simplified conceptual illustrations of systems for identifying security breaches caused when a computer-based software application uses a computer-based web browser application, constructed and operative in accordance with alternative embodiments of the present invention.

Reference is now made to FIG. 3, which is a simplified illustration of a system for identifying security breaches caused when a computer-based software application uses a computer-based web browser application. The system of FIG. 3 is substantially similar to the system of FIG. 1 with the notable exception that FIG. 3 includes a wrapper 300 that is compiled with browser 104, or with application 102 or any functions thereof which controls browser 104. Wrapper 300 detects the presence of malicious content in data read by browser 108 and/or its execution, whereupon wrapper 300 or security breach detector 112 may provide a notification using any known technique regarding the security breach. In this embodiment security breach detector 110 may be executed as part of application 102. Alternatively to compiling wrapper 300 together with application 102 or with browser 104, application 102 or browser 104 may be compiled and later patched at run-time or statically to use wrapper 300.

Figure 4:
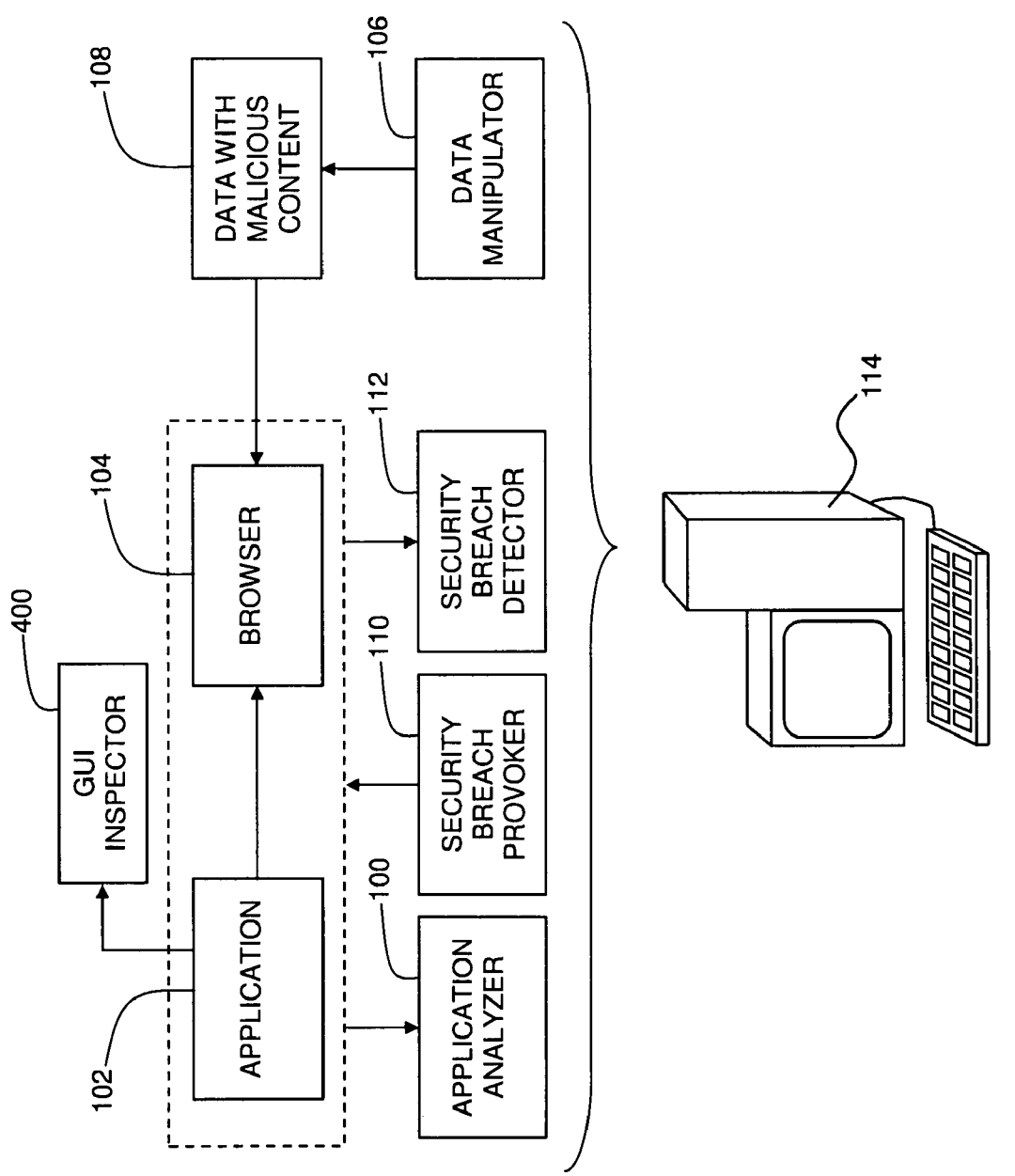

Reference is now made to FIG. 4, which is a simplified illustration of a system for identifying security breaches caused when a computer-based software application uses a computer-based web browser application, constructed and operative in accordance with an embodiment of the present invention. The system of FIG. 4 is substantially similar to the system of FIG. 1 with the notable exception that FIG. 4 includes a GUI inspector 400, such as Spy++™, commercially available from Microsoft Corporation, Redmond. WA, that inspects and enumerates through the GUI objects of application 102. If application 102 utilizes browser 104 as an embedded browser object, GUI inspector 400 may query browser 104 to determine the existence of malicious content that is accessed by browser 104, whereupon GUI inspector 400 or security breach detector 112 may provide a notification using any known technique regarding the security breach.

Figure 5:
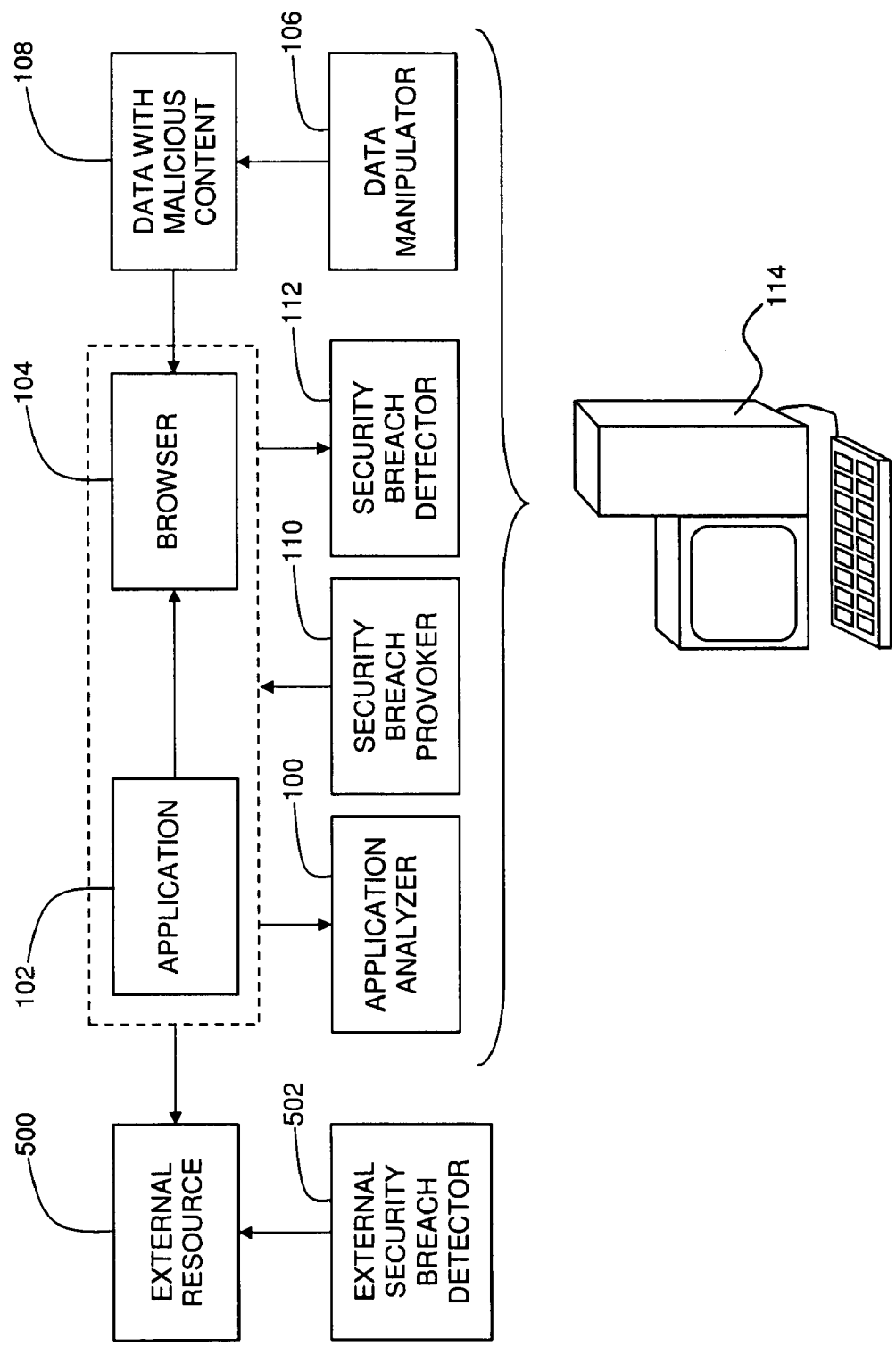

Reference is now made to FIG. 5, which is a simplified illustration of a system for identifying security breaches caused when a computer-based software application uses a computer-based web browser application, constructed and operative in accordance with an embodiment of the present invention. The system of FIG. 5 is substantially similar to the system of FIG. 1 with the notable exception that data manipulator 106 manipulates data 108 such that the malicious content includes a one or more instructions, such as in the form of a script or command, that tries to interact with an external resource 500, such as a web server. In this embodiment security breach detector 112 and/or an external security breach detector 502 that is external to computer 114 detects the interaction with external resource 500 and provides a notification using any known technique regarding the security breach.

Figure 6:
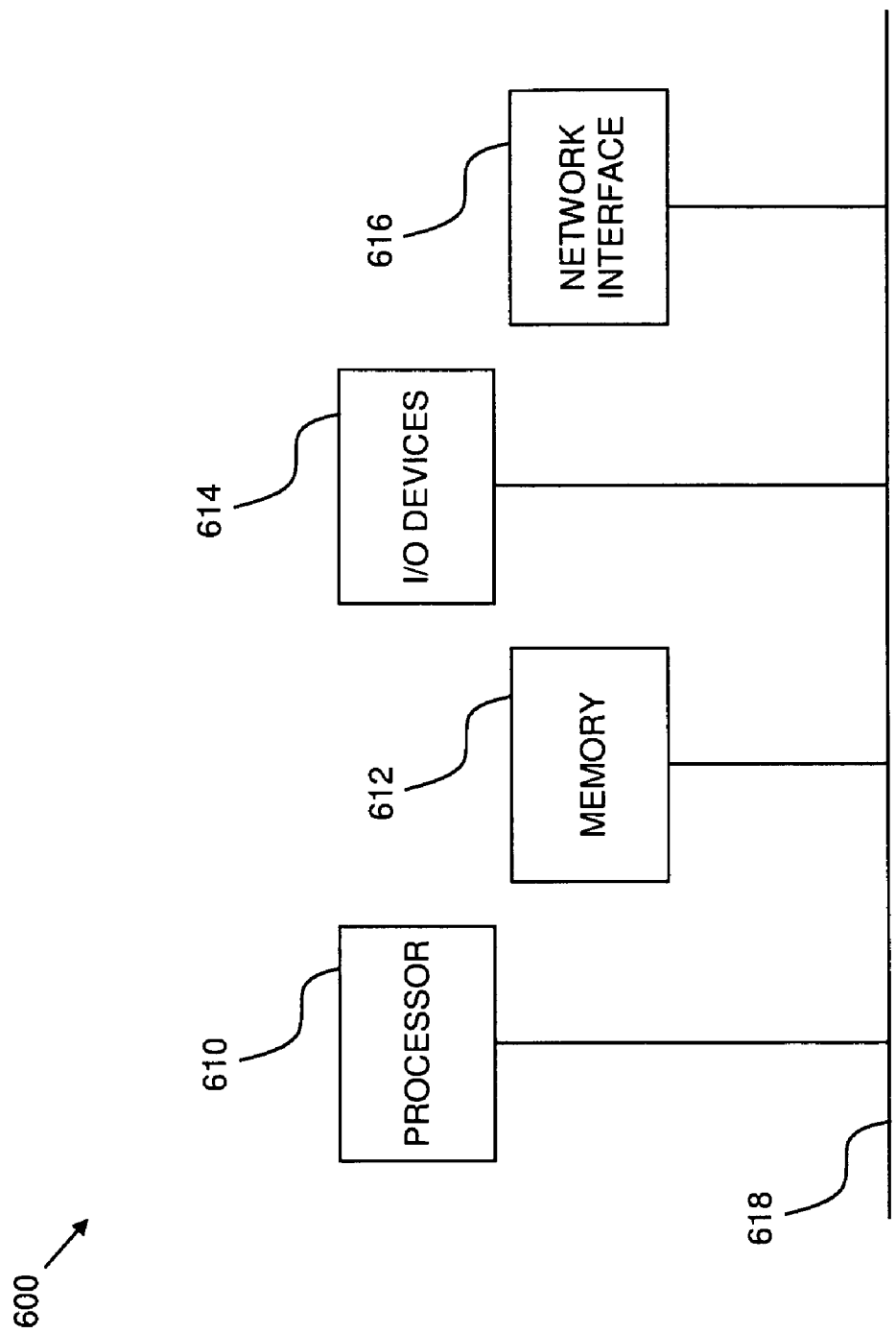
FIG. 6 is a simplified block diagram illustration of an exemplary hardware implementation of a computing system, constructed and operative in accordance with an embodiment of the present invention.

Referring now to FIG. 6, block diagram 600 illustrates an exemplary hardware implementation of a computing system in accordance with which one or more components/methodologies of the invention (e.g., components/methodologies described in the context of FIGS. 1-5) may be implemented, according to an embodiment of the present invention.

As shown, the techniques for controlling access to at least one resource may be implemented in accordance with a processor 610, a memory 612, I/O devices 614, and a network interface 616, coupled via a computer bus 618 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example. RAM ROM, a fixed memory device (e.g. hard drive), a removable memory device (e.g., diskette). Hash memory, etc Such memory may be considered a computer readable storage medium.

In addition, the phrase "input/output devices" or "I/O devices" as used herein is intended to include, for example, one or more input devices (e.g. keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be constated as limiting the invention to the embodiments shown. It is appreciated that various modifications may occur to those skilled in the art that, while not specifically shown herein, are nevertheless within the true spirit and scope of the invention.

What is claimed is:

1. A computer-implemented method for identifying a security breach caused when a computer-based software application uses a computer-based web browser application, the method comprising:

identifying, at a computer, at least one function within a computer-based software application that causes a computer-based web browser application to access data from a source that is external to said software application;

at least partially replacing said data, at said computer, with malicious content that is configured to cause a predefined action to occur when said malicious content is accessed by said web browser application, wherein said predefined action is associated with a known security breach when said predefined action occurs subsequent to said malicious content being accessed by said web browser application;

causing said software application to perform said function at said computer; and determining, at said computer, whether said predefined action is performed.

2. A method according to claim 1 and further comprising monitoring the execution of said computer-based software application to identify said function.

3. A method according to claim 1 wherein said steps are performed when said web browser application is embedded within said software application.

4. A method according to claim 1 wherein said at least partially replacing step comprises at least partially replacing said data at said source.

5. A method according to claim 1 and further comprising providing a notification regarding said security breach.

6. A method according to claim 1 and further comprising providing any of said applications with file wrapper configured to detect the presence of said malicious content in said data.

7. A method according to claim 1 and further comprising:
inspecting and enumerating through GUI objects of said software application;
determining whether said software application utilizes said web browser application as an embedded browser object; and
querying said embedded browser object to determine the existence of said malicious content that is accessed by said embedded browser object.

8. A method according to claim 1 wherein said at least partially replacing step comprises at least partially replacing said data such that said malicious content includes at least one instruction for interacting with an external resource, and wherein said method further comprises detecting said interaction with said external resource.

9. A system for identifying a security breach caused when a computer-based software application uses a computer-based web browser application, the system comprising:
memory including one or more program instructions, said program instructions comprising an application analyzer, a data manipulator, a security breach provoker and a security breach detector; and
a processor configured to:
utilizing said application analyzer, identify at least one function within a computer-based software application that causes a computer-based web browser application to access data from a source that is external to said software application;
utilizing said data manipulator, at least partially replace said data with malicious content that is configured to cause a predefined action to occur when said malicious content is accessed by said web browser application, wherein said predefined action is associated with a known security breach when said predefined action occurs subsequent to said malicious content being accessed by said web browser application;
utilizing said security breach provoker, cause said software application to perform said function; and
utilizing said security breach detector, determine whether said predefined action is performed.

10. A system according to claim 9 wherein said software application is configured such that its main purpose does not require it to include functions that are uniquely associated with web browsers, and such that it has the ability to cause said web browser application to perform any function that is uniquely associated with web browsers.

11. A system according to claim 9 wherein said web browser application is either of a stand-alone browser application external to said software application and an embedded browser with respect to said software application.

12. A system according to claim 9 wherein said processor is further configured, utilizing said security breach provoker, to simulate network connections to intercept attempts by said web browser application to access said data and ensure that said web browser application accesses said data.

13. A system according to claim 9 wherein said processor is further configured, utilizing said security breach detector, to provide a notification regarding said security breach.

14. A system according to claim 9 wherein said processor is further configured to:
utilizing said data manipulator, replace data with malicious content that creates a window containing a predefined string; and
utilizing said security breach detector, detect the creation of said window and determine whether said window contains said predefined string.

15. A system according to claim 9, wherein said program instructions further comprise a wrapper that is cooperative with either of said software application and said web browser application, wherein said processor is further configured, utilizing said wrapper, to detect the presence of said malicious content in said data.

16. A system according to claim 9, wherein said program instructions further comprise a GUI inspector, and said processor is further configured, utilizing said GUI inspector, to:
inspect and enumerate through GUI objects of said software application;
determine whether said software application utilizes said web browser application as an embedded browser object; and
query said embedded browser object to determine the existence of said malicious content that is accessed by said embedded browser object.

17. A system according to claim 9 wherein said malicious content includes at least one instruction for interacting with an external resource, and further comprising said program instructions further comprise an external security breach detector, wherein said processor is further configured, utilizing said external security breach detector, to detect said interaction with said external resource.

18. A computer program product for identifying a security breach caused when a computer-based software application uses a computer-based web browser application, the computer program product comprising:
a computer readable storage device having computer program instructions embodied therewith, the computer program instructions being operative to:
identify at least one function within a computer-based software application that causes a computer-based web browser application to access data from a source that is external to said software application;
at least partially replace said data with malicious content that is configured to cause a predefined action to occur when said malicious content is accessed by said web browser application, wherein said predefined action is associated with a known security breach when said predefined action occurs subsequent to said malicious content being accessed by said web browser application;
cause said software application to perform said function; and
determine whether said predefined action is performed.

* * * * *